(12) United States Patent
Hong (10) Patent No.: US 6,663,066 B1
(45) Date of Patent: Dec. 16, 2003

(54) MULTI-FUNCTION SUPPORT (75) Inventor: Jing-Qing Hong, Taipei (TW)

(73) Assignee: KYE Systems Corp. (TW)

( * ) Notice: Subject to any disclaimer, the term of this patent is extended or adjusted under 35 U.S.C. 154(b) by 0 days.

(21) Appl. No.: 10/277,865

(22) Filed: Oct. 22, 2002

(51) Int. Cl.$^7$ ............................................... A47B 96/06
(52) U.S. Cl. ................... 248/231.41; 396/421
(58) Field of Search ............................ 248/231.41, 121, 248/126, 150, 163.1, 163.2, 166, 172, 187.1, 442.2, 918; 396/421, 422, 423, 424, 425, 426, 428, 535, 536, 537, 538, 539, 540, 541

(56) References Cited

U.S. PATENT DOCUMENTS

| | | | | |
|---|---|---|---|---|
| 4,648,698 A | * | 3/1987 | Iwasaki | 248/163.1 |
| 5,855,343 A | * | 1/1999 | Krekelberg | 248/12 |
| D411,220 S | * | 6/1999 | Surabian | D16/242 |
| 6,431,507 B2 | * | 8/2002 | Prather et al. | 248/166 |

* cited by examiner

Primary Examiner—Ramon O. Ramirez
(74) Attorney, Agent, or Firm—Raymond Sun (57) ABSTRACT

A multi-function support has a main body having a gripping surface, and at least one arm that is pivotably connected to the main body, with each arm having a resilient element and a gripping surface. A gripping space is defined between the gripping surface of the main body and the gripping surface of each arm, and each resilient element exerts a natural bias that normally pushes the gripping surface of the corresponding arm towards the gripping surface of the main body.

17 Claims, 7 Drawing Sheets

FIG. 1

(PRIOR ART)

FIG. 2

(PRIOR ART)

FIG. 3

(PRIOR ART)

FIG. 4

(PRIOR ART)

MULTI-FUNCTION SUPPORT

BACKGROUND OF THE INVENTION

1. Field of the Invention

The present invention relates to a stand or support for supporting computer accessories, and in particular, to a support which can be folded and opened such that the support can be easily to be stored and portable.

2. Description of the Prior Art

Brackets and various supporting stands have become popular in the booming computer market for supporting accessory devices. For example, one kind of bracket is installed over the top of a computer monitor, so as to same the user more space on top of a desk-top. However, most conventional supports suffer from one or more of the following drawbacks. First, most of these conventional supports are large or heavy, or occupy a large amount space, so that they are not suitable for use with notebook computers. Second, many of these conventional supports are difficult and time-consuming to install.

Generally, a notebook computer or a LCD monitor might integrate a microphone, a speaker and other accessories as part of the same system. However, a PC camera or a PC video camera typically still requires a support or stand in order to attach the camera to the notebook computer or LCD monitor. A conventional support for PC cameras is typically designed to be placed on a desk-top or to be installed on the frame of a monitor.

Figure 1:
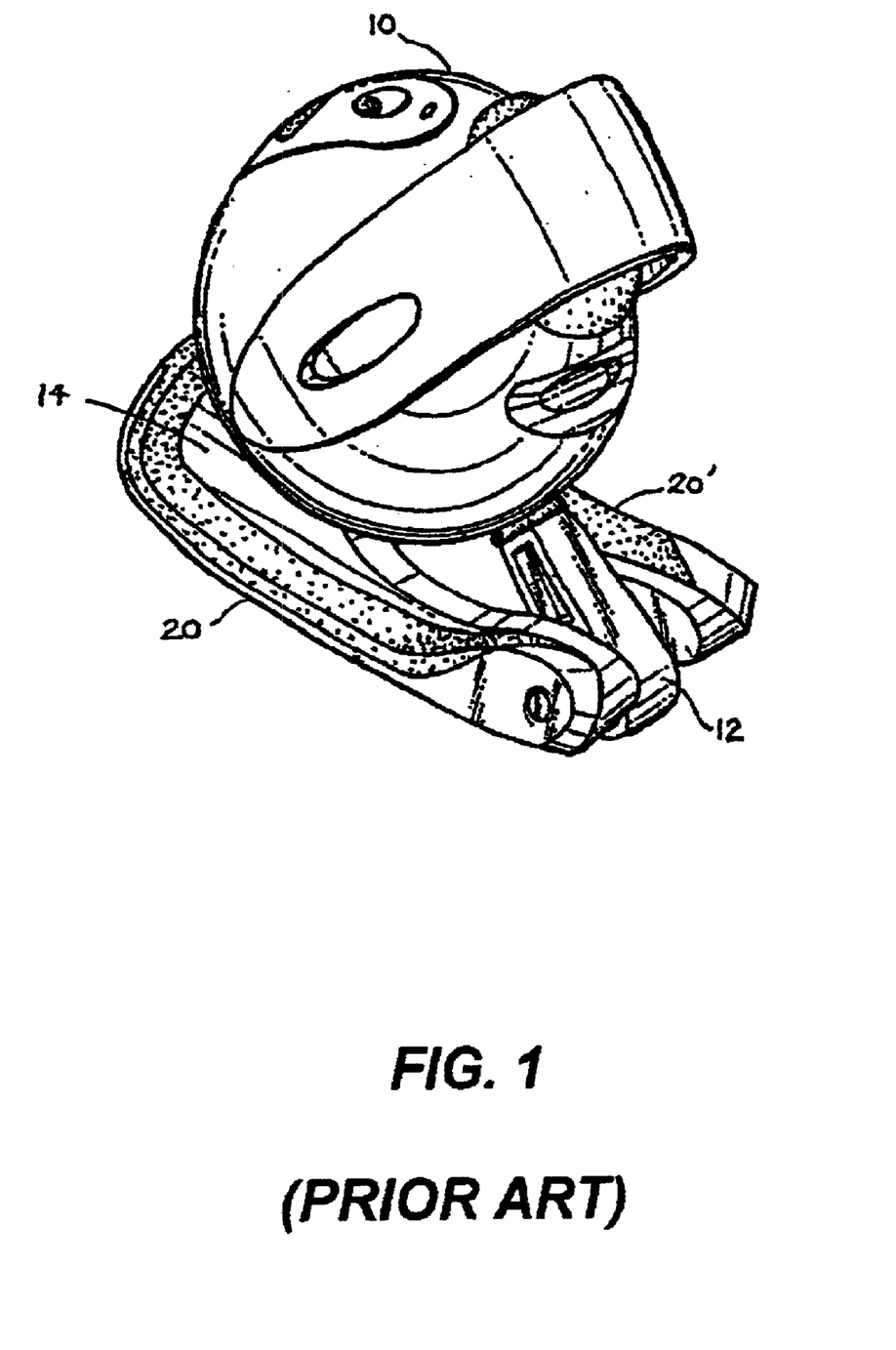
FIG. 1 is a perspective view of a prior art support shown in its folded position.
Figure 2:
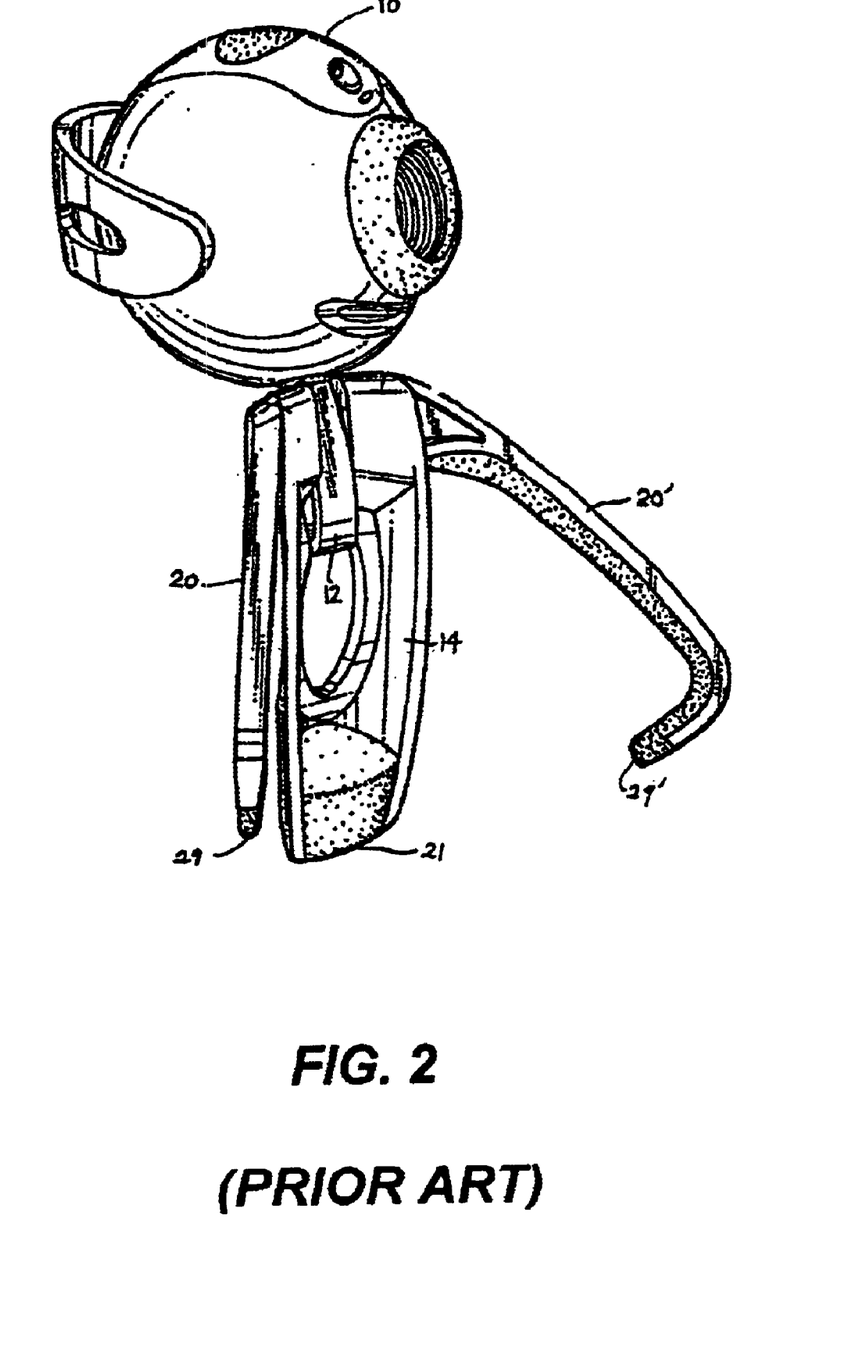
FIG. 2 is a perspective view of the support of FIG. 1 shown in its unfolded position.
Figure 3:
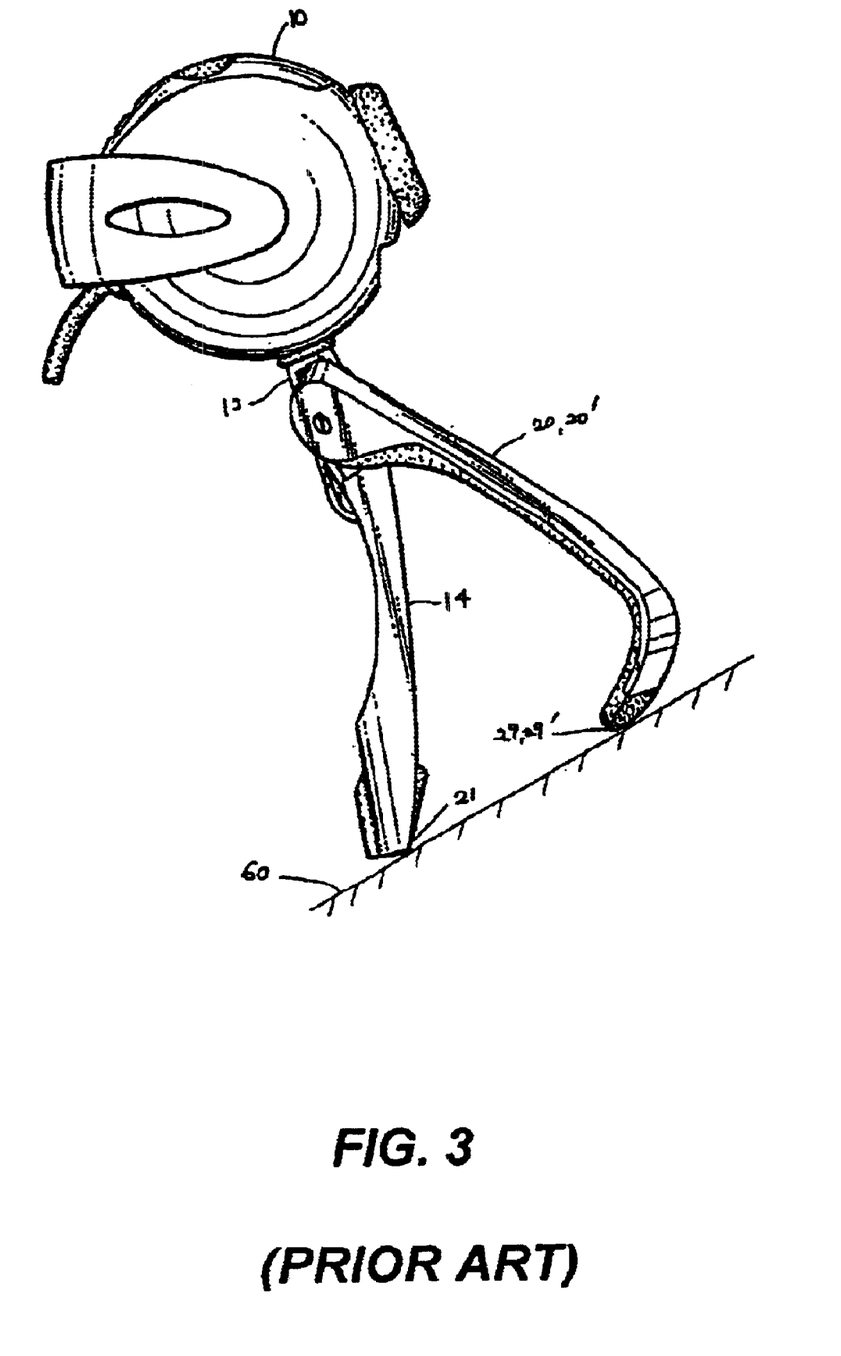
FIG. 3 is a side view of the support of FIG. 1 shown in a standing orientation.
Figure 4:
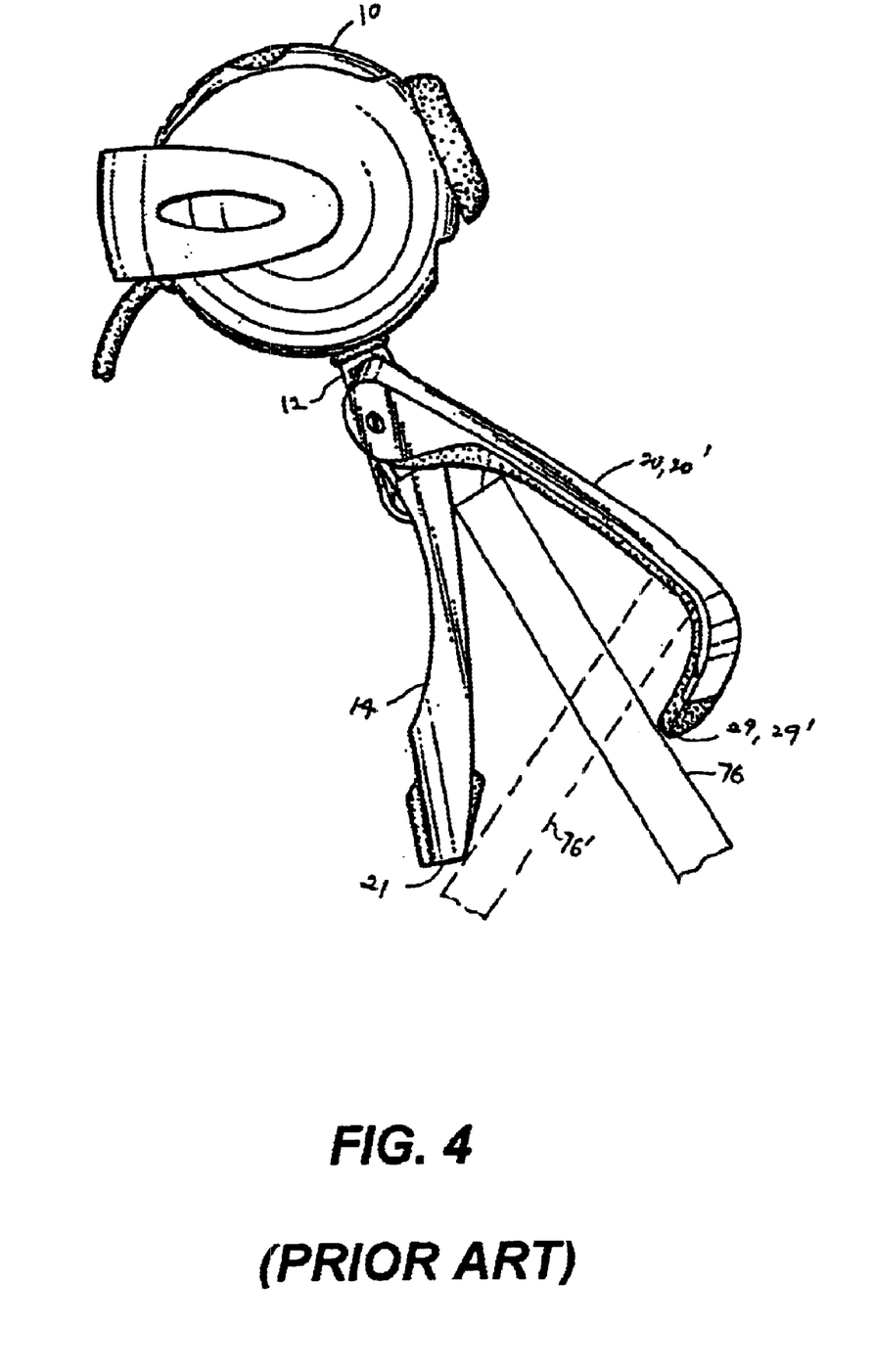
FIG. 4 is a side view of the support of FIG. 1 shown in a clamping orientation.

U.S. Pat. No. 6,431,507 illustrates one known support mechanism. Referring to FIGS. 1–4, the support mechanism comprises a neck 12 for holding a camera 10, a main arm 14 to which the neck 12 is connected, and a left arm 20' and a right arm 20 that are pivotably coupled to the main arm 14 along each side of the main arm 14. When the main arm 14, left arm 20' and right arm 20 are unfolded or pivoted, their respective ends 21, 29', 29 will form a three-point support as shown in FIGS. 2–4. In addition, as shown in FIG. 4, the main arm 14, left arm 20' and right arm 20 can clamp a frame 76 or 76' of a monitor of a notebook computer between a varying angles. Unfortunately, the support mechanism shown in U.S. Pat. No. 6,431,507 suffers from several drawbacks. First, the support mechanism is designed to support only a camera, and cannot be used to support other accessories. Second, the camera 10 is supposed to be heavier than the support mechanism, so the overall structure has a higher center-of-gravity position that may cause the camera 10 to topple easily if the user were to inadvertently touch the camera 10. Third, the ends 29' and 29 (with or without stain or dust) will tend to wear the surface of the frame that they attach to.

Thus, there still remains a need for a support mechanism for supporting a computer accessory which overcomes the drawbacks described above.

SUMMARY OF THE DISCLOSURE

It is an object of the present invention to provide a stable, compact and simple support for a computer accessory that can be placed on a working surface.

It is another object of the present invention to provide a support for a computer accessory that can also be clamped on to a fringe of any object.

It is yet another object of the present invention to provide a support for a computer accessory that is portable, and which can be folded and stored easily.

In order to accomplish the objects of the present invention, there is provided a multi-function support having a main body having a gripping surface, and at least one arm that is pivotably connected to the main body, with each arm having a resilient element and a gripping surface. A gripping space is defined between the gripping surface of the main body and the gripping surface of each arm, and each resilient element exerts a natural bias that normally pushes the gripping surface of the corresponding arm towards the gripping surface of the main body.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, compositions, components, mechanisms and methods are omitted so as to not obscure the description of the present invention with unnecessary detail.

Figure 5:
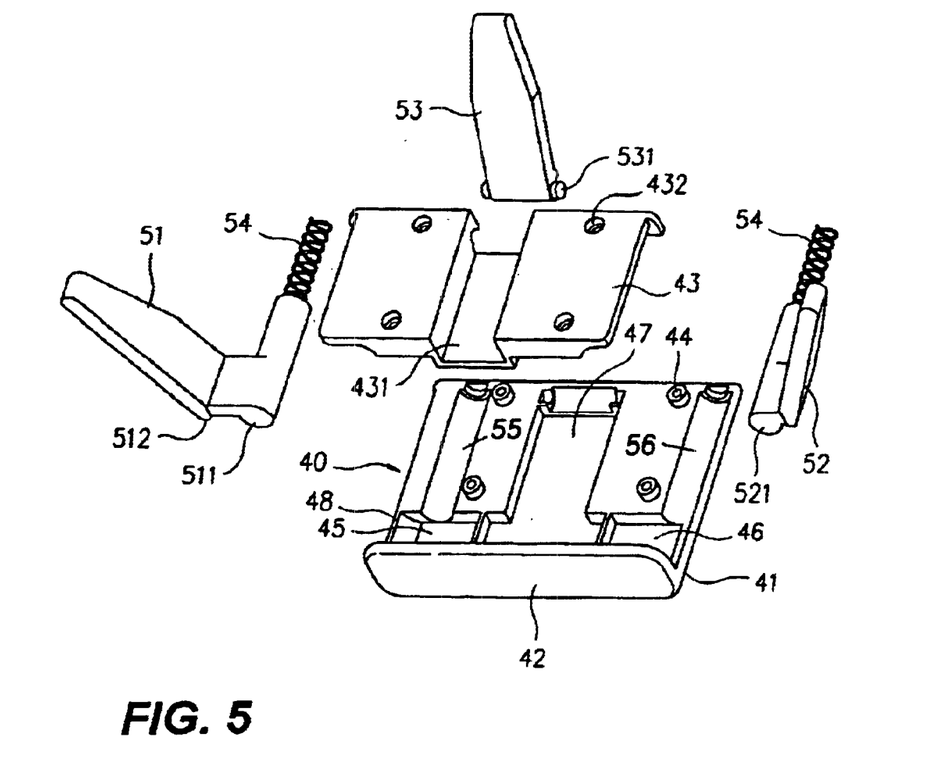
FIG. 5 is an exploded perspective view of a support according to one embodiment of the present invention.
Figure 6:
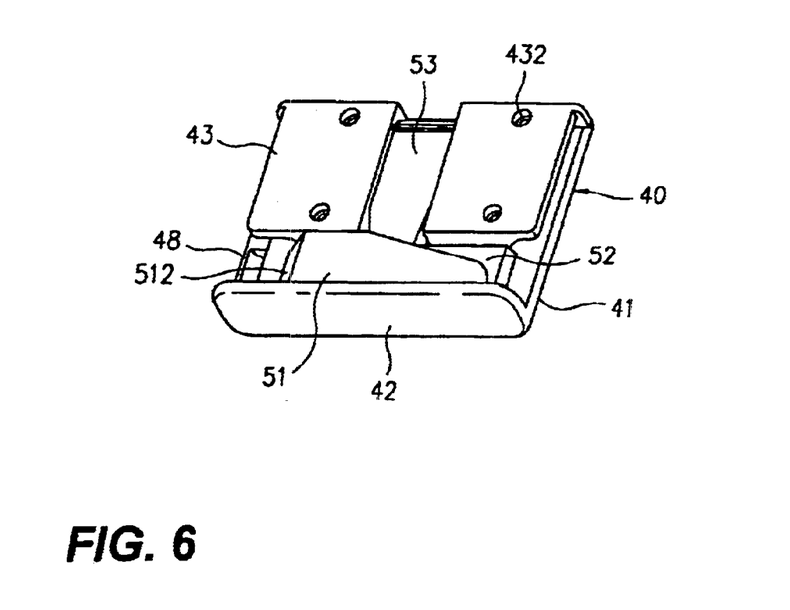
FIG. 6 is a perspective view of the support of FIG. 5 shown in a folded orientation.
Figure 7:
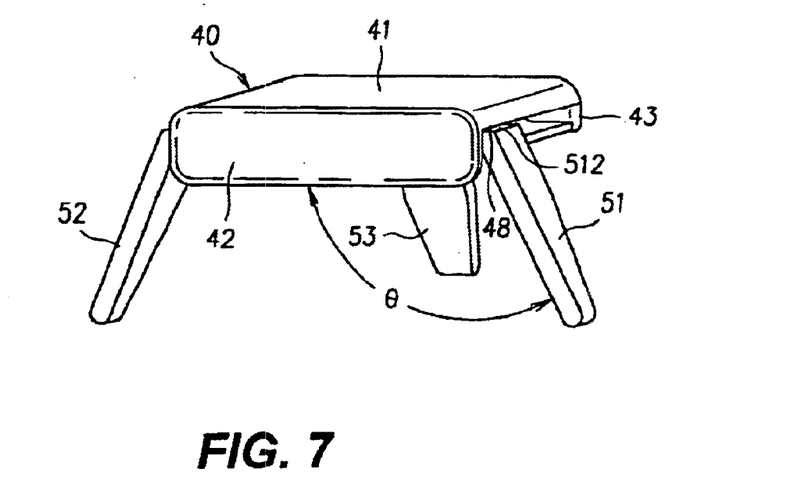
FIG. 7 is a perspective view of the support of FIG. 5 shown in an unfolded orientation.

FIGS. 5–7 illustrate one embodiment of a multi-function support according to the present invention. The multi-function support has a main body 40 having a housing (which can have a generally rectangular configuration) and a cover 43 that is removably coupled to the housing. The housing of the main body 40 has a top surface 41 and a shoulder 42 that extends downward from the front side of the top surface 41.

A plurality of foldable arms 51, 52, 53 are pivotably connected to the main body 40 in a manner such that each arm 51, 52, 53 can be spread outwardly away from the main body 40 at a certain angle, and then folded back into the confines of the main body 40 to form a compact configuration. Each of two L-shaped side arms 51, 52 is pivotably coupled adjacent one of the two lateral sides of the top surface 41 that are perpendicular to the front side of the top surface 41. In particular, a semi-circular groove 55 and 56 is provided parallel to each lateral side of the tope surface 41, and each groove 55 and 56 communicates with a recess 45 and 46, respectively, that extends transverse to the respective groove 55 and 56, and which is positioned adjacent the shoulder 42. A first portion of each of the side arms 51, 52 is positioned inside one of the semi-circular grooves 55 and 56, respectively. A second portion (which is perpendicular to the first portion) of each side arm 51, 52 is positioned inside one of the recesses 45 and 46, respectively. Each side arm 51, 52 has a resilient element, such as a spring 54, which is positioned inside the corresponding groove 55, 56. Thus, each side arm 51, 52 is positioned inside the groove 55 or 56 and the recess 45 or 46, and between the cover 43 and the top surface 41. In use, each spring 54 is compressed when its corresponding arm 51, 52 is moved away from the shoulder 42, o that the distance between each arm 51, 52 and the shoulder 42 is adjustable.

The cover 43 is removably connected to the housing by means of screws inserted through sets of aligned holes 432 and 44 in the cover 43 and the housing, respectively. The cover 43 has a central recess 431 that is received inside a corresponding recess 47 of the housing. The arm 53 is received inside the central recess 431 and is pivotably connected to the walls of the central recess 431 at a location that is adjacent the rear side of the top surface 41, opposite to the shoulder 42. The pivoting axles for the arms 51, 52 and 53 are indicated by the numerals 511, 521 and 531, respectively.

The supporting can be deployed quickly and conveniently by opening or unfolding the arms 51, 52, 53. As best shown in FIG. 7, the arms 51, 52, 53 define the corners of a triangle when the arms 51, 52, 53 are fully extended in their deployed position. When the arm 51 is unfolded to a certain angle "theta" that is greater than ninety degrees, an abutment surface 512 of the arm 51 will abut against a portion 48 of the lateral side of the top surface 41 (see also FIG. 5). The arms 52 and 53 operate under the same working principle. When all the arms 51, 52, 53 are fully extended, an accessory can be placed on the top surface 41. The accessory can be a digital camera, a PC video camera or any other computer-released accessory or device.

Similarly, the support can be quickly and conveniently folded for storage to enhance its portability. As shown in FIGS. 5 and 6, the arms 51, 52, 53 are received into their respective recesses 45, 46, 431 when they are folded into the confines of the main body 40 (the cover 43 and the housing 41), so that the resulting support has a compact configuration that can be conveniently stored or moved around.

Figure 8:
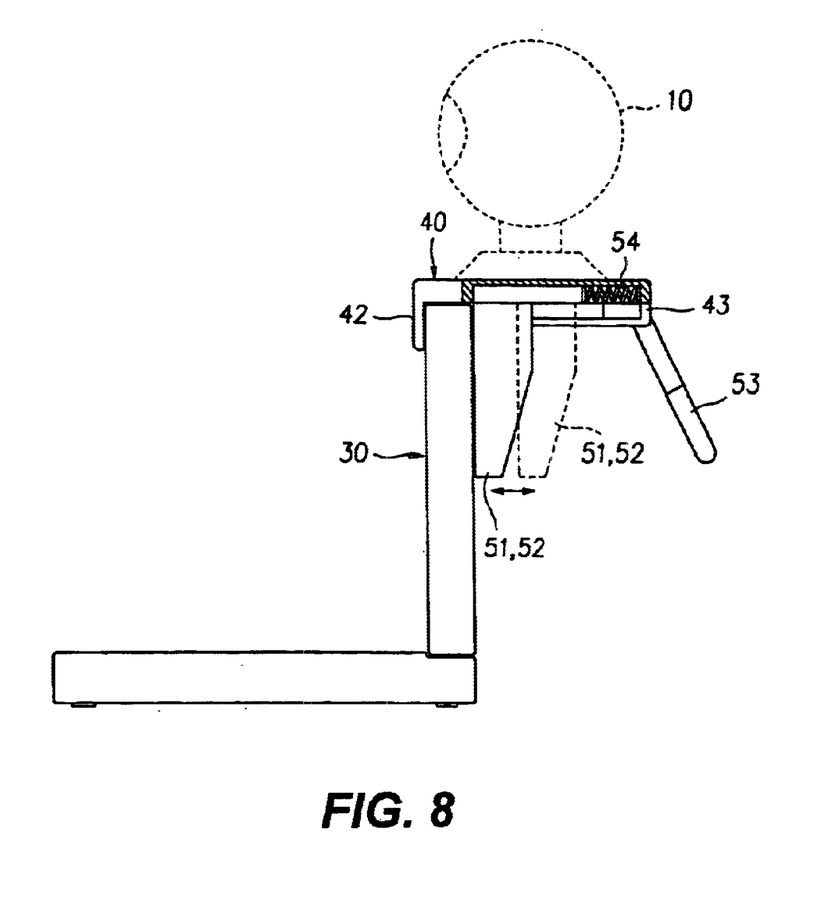
FIG. 8 is a side view of the support of FIG. 5 shown in its clamping orientation.

FIG. 7 illustrates the support in an orientation where the arms 51, 52, 53 can be placed on top of a flat surface (such as a desk-top) to support an accessory on the top surface 41. However, the support can also be clamped on to the frame of a notebook or monitor. Referring to FIG. 8, the arms 51, 52 can be pushed towards the rear (i.e., away from the shoulder 42) against the normal bias of the springs 54. Numerals 511 and 512 also designate a grip surface on each of the arms 51 and 52, respectively. As the arms 51, 52 are pushed away from the shoulder 42, a gripping space is defined between the grip surfaces 511, 512 and the shoulder 42. Any object 30 (e.g., a frame of a notebook computer of LCD monitor of a notebook computer) can be placed in this gripping space, and then the user can release the pushing force on the arms 51, 52 so that the springs 54 naturally bias the arms 51, 52 back towards the shoulder 42, thereby causing the grip surfaces 511, 512 to clamp or grip the object 30. The support of the present invention can be used to grip a frame having any variable thickness (since the arms 51, 52 can be pushed away from the shoulder 42 to accommodate a frame having a greater thickness), so that the support of the present invention can actually be used with a wide variety of frames or objects 30. In addition, since the shoulder 42 is designed to grip the frame of an LCD monitor (and not the LCD panel), the LCD panel can be fully protected from scratches or scraping from the gripping surfaces 511, 512 and the shoulder 42.

As an alternative, the arms 51, 52 can be linked or otherwise coupled together so that the user only needs to push one arm 51 or 52 to move the arms 51, 52 away from the shoulder 42 to define the gripping space.

Figure 9:
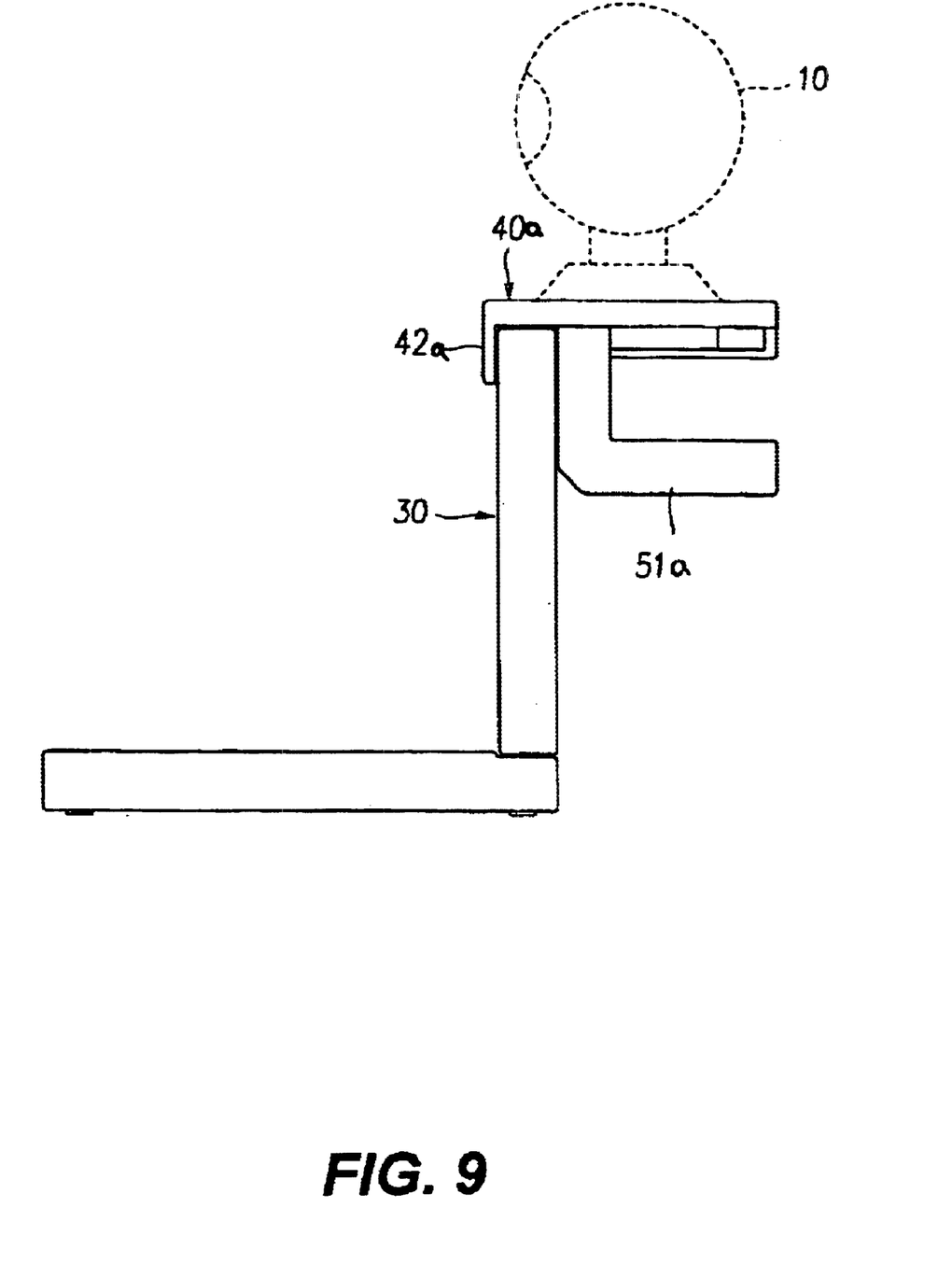
FIG. 9 is a side view of a support according to another embodiment of the present invention shown in a clamping orientation.

FIG. 9 illustrates a possible modification that can be made to the embodiment shown in FIGS. 5–8. In FIG. 9, the arm 51a can be configured to have a sufficiently large or elongated bottom surface, such as having an L-shape. The arm 51a can be pivotably coupled to the main body 40a in the same manner as the arm 51 is pivotably coupled to the main body 40 in FIGS. 5–8. The other arm is not shown, but can be the same as the arm 51a and pivotably coupled to the main body 40a in the same manner as the arm 52 is pivotably coupled to the main body 40 in FIGS. 5–8. In the embodiment of FIG. 9, two such arms 51a can be provided, and the arm 53 can be omitted. The large or elongated bottom surface on the arms 51a allows the two arms 51a to be seated on top of a flat surface in a stable manner, yet the two arms 51a can be operated in the same manner as the arms 51, 52 in FIGS. 5–8 to clamp an object or frame (i.e., by moving the arms 51a away from the shoulder 42a). Corresponding recesses and grooves (not shown) similar to recesses and grooves 55, 56, 45, 46 can also be provided in the main body 40a to receive the arms 51a.

Thus, with the embodiments depicted above, the supports according to the present invention can provide a stable, small-sized and simple structure that can be placed on a flat working surface. In addition, the supports according to the present invention can also grip or clamp any object having any varying thickness.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A multi-function support, comprising:
a main body having a gripping surface;
at least one arm that is movably retained inside a portion of the main body, each of the at least one arm having a resilient element and a gripping surface;
a gripping space defined between the gripping surface of the main body and the gripping surface of each of the at least one arm; and
wherein each resilient element exerts a natural bias that normally pushes the gripping surface of the corresponding arm towards the gripping surface of the main body.

2. The apparatus of claim 1, wherein the at least one arm comprises two arms.

3. A multi-function support, comprising:
a main body having a gripping surface;
at least one arm that is pivotally connected to the main body, each of the at least one arm having a resilient element and a gripping surface;
a gripping space defined between the gripping surface of the main body and the gripping surface of each of the at least one arm;
wherein each resilient element exerts a natural bias that normally pushes the gripping surface of the corresponding arm towards the gripping surface of the main body; and wherein the main body has at least one recess for receiving a corresponding arm when the arm is pivoted to be folded into the main body.

4. A multi-function support, comprising:
a main body having a gripping surface;
two arms that are pivotably connected to the main body, each of the arms having a resilient element and a gripping surface;
a gripping space defined between the gripping surface of the main body and the gripping surface of each arm;
wherein each resilient element exerts a natural bias that normally pushes the gripping surface of the corresponding arm towards the gripping surface of the main body; and
further including a third arm that is pivotably connected to the main body at a location opposite from the gripping surface of the main body.

5. The apparatus of claim 4, wherein the third arm is positioned at about the center of the main body so that the three arms define the three points of a triangle.

6. A multi-function support, comprising:
a main body having a gripping surface;
at least one arm that is pivotably connected to the main body, each of the at least one arm having a resilient element and a gripping surface;
a gripping space defined between the gripping surface of the main body and the gripping surface of each of the at least one arm;
wherein each resilient element exerts a natural bias that normally pushes the gripping surface of the corresponding arm towards the gripping surface of the main body; and
wherein the gripping surface of the main body is a shoulder extending from a front side of the main body.

7. A multi-function support, comprising:
a main body having a gripping surface;
two arms that is pivotably connected to the main body, each of the arms having a resilient element and a gripping surface;
a gripping space defined between the gripping surface of the main body and the gripping surface of each arm;
wherein each resilient element exerts a natural bias that normally pushes the gripping surface of the corresponding arm towards the gripping surface of the main body; and
wherein the two arms have an L-shaped configuration with an enlarged bottom surface.

8. A multi-function support, comprising:
a main body having a gripping surface;
at least one arm that is pivotably connected to the main body, each of the at least one arm having a resilient element and a gripping surface;
a gripping space defined between the gripping surface of the main body and the gripping surface of each of the at least one arm;
wherein each resilient element exerts a natural bias that normally pushes the gripping surface of the corresponding arm towards the gripping surface of the main body; and
wherein the main body comprises a housing and a cover that is removably connected to the housing, with at least one recess defined in the housing for receiving a corresponding arm when the arm is pivoted to be folded into the main body.

9. A multi-function support, comprising:
a main body having a front side and a rear side, and a shoulder extending from the front side, the main body further including a plurality of recesses;
a plurality of arms connected to the main body, with each arm being received inside a corresponding recess;
a gripping space defined between the shoulder and the gripping surface of each arm;
a rear arm that is pivotably connected to the main body at a location opposite from the shoulder;
wherein at least one arm has a resilient element and a gripping surface; and
wherein each resilient element exerts a natural bias that normally pushes the gripping surface of the corresponding arm towards the shoulder.

10. A combination, comprising:
a notebook computer having a frame;
a support, comprising:
  a main body having a gripping surface;
  at least one arm that is movably retained inside a portion of the main body, each of the at least one arm having a resilient element and a gripping surface; and
  a gripping space defined between the gripping surface of the main body and the gripping surface of each of the at least one arm;
wherein the frame is received inside the gripping space, and each resilient element exerts a natural bias that normally pushes the gripping surface of the corresponding arm towards the gripping surface of the main body to grip the frame.

11. The combination of claim 10, wherein the at lest one arm comprises two arms.

12. A combination, comprising:
a notebook computer having a frame;
a support, comprising:
  a main body having a gripping surface;
  at least one arm that is pivotably connected to the main body, each of the at least one arm having a resilient element and a gripping surface;
  a gripping space defined between the gripping surface of the main body and the gripping surface of each of the at least one arm;
wherein the frame is received inside the gripping space, and each resilient element exerts a natural bias that normally pushes the gripping surface of the corresponding arm towards the gripping surface of the main body to grip the frame; and
wherein the main body has at least one recess for receiving a corresponding arm when the arm is pivoted to be folded into the main body.

13. A combination, comprising:
a notebook computer having a frame;
a support, comprising:
  a main body having a gripping surface;
  two arms that are pivotably connected to the main body, each arm having a resilient element and a gripping surface;
  a gripping space defined between the gripping surface of the main body and the gripping surface of each arm;
wherein the frame is received inside the gripping space, and each resilient element exerts a natural bias that normally pushes the gripping surface of the corresponding arm towards the gripping surface of the main body to grip the frame; and further including a third arm that is pivotably connected to the main body at a location opposite from the gripping surface of the main body.

14. The combination of claim 13, wherein the third arm is positioned at about the center of the main body so that the three arms define the three points of a triangle.

15. A combination, comprising:

a notebook computer having a frame;

a support, comprising:
- a main body having a gripping surface;
- at least one arm that is pivotably connected to the main body, each of the at least one arm having a resilient element and a gripping surface;
- a gripping space defined between the gripping surface of the main body and the gripping surface of each of the at least one arm;

wherein the frame is received inside the gripping space, and each resilient element exerts a natural bias that normally pushes the gripping surface of the corresponding arm towards the gripping surface of the main body to grip the frame; and wherein the gripping surface of the main body is a shoulder extending from a front side of the main body.

16. A combination, comprising:

a notebook computer having a frame;

a support, comprising:
- a main body having a gripping surface;
- two arms that are pivotably connected to the main body, each arm having a resilient element and a gripping surface;
- a gripping space defined between the gripping surface of the main body and the gripping surface of each arm;

wherein the frame is received inside the gripping space, and each resilient element exerts a natural bias that normally pushes the gripping surface of the corresponding arm towards the gripping surface of the main body to grip the frame; and wherein the two arms have an L-shaped configuration with an enlarged bottom surface.

17. A combination, comprising:

a notebook computer having a frame;

a support, comprising:
- a main body having a gripping surface;
- at least one arm that is pivotably connected to the main body, each of the at least one arm having a resilient element and a gripping surface;
- a gripping space defined between the gripping surface of the main body and the gripping surface of each of the at least one arm;

wherein the frame is received inside the gripping space, and each resilient element exerts a natural bias that normally pushes the gripping surface of the corresponding arm towards the gripping surface of the main body to grip the frame; and wherein the main body comprises a housing and a cover that is removably connected to the housing, with at least one recess defined in the housing for receiving a corresponding arm when the arm is pivoted to be folded into the main body.

\* \* \* \* \*